(12) United States Patent
Sisson

(10) Patent No.: US 6,543,834 B2
(45) Date of Patent: Apr. 8, 2003

(54) FLIP TOP LOCKING TRUCK TOPPER

(76) Inventor: Daniel Robert Sisson, 311 N. Port, Osage Beach, MO (US) 65065

( * ) Notice: Subject to any disclaimer, the term of this patent is extended or adjusted under 35 U.S.C. 154(b) by 0 days.

(21) Appl. No.: 09/939,496

(22) Filed: Aug. 24, 2001

(65) Prior Publication Data

US 2003/0038505 A1 Feb. 27, 2003

(51) Int. Cl.$^7$ .................................................. B60P 7/02
(52) U.S. Cl. .............................. 296/100.1; 296/100.08; 296/43
(58) Field of Search ........................ 296/100.06, 100.1, 296/164, 165, 43

(56) References Cited

U.S. PATENT DOCUMENTS

| | | |
|---|---|---|
| 2,912,276 A | 11/1959 | Schwartz et al. |
| 4,083,596 A | 4/1978 | Robertson |
| 4,101,162 A * | 7/1978 | Koehn |
| 4,533,171 A | 8/1985 | Lake |
| 4,756,571 A | 7/1988 | Lake |
| 5,102,185 A | 4/1992 | Lake |
| 5,104,175 A | 4/1992 | Enninga |
| 5,127,701 A | 7/1992 | Miller |
| 5,366,266 A | 11/1994 | Harbison |
| 5,503,450 A | 4/1996 | Miller |
| 5,595,418 A | 1/1997 | Medlin |

* cited by examiner

*Primary Examiner*—D. Glenn Dayoan
*Assistant Examiner*—Scott Carpenter
(74) *Attorney, Agent, or Firm*—Richard J. Grundstrom

(57) ABSTRACT

A flip top locking topper for a pickup truck having a forward wall and a shell. A hinge support is rigidly attached to a forward end of the pickup box along with the forward wall. The shell, attached to the hinge support by one or more hinges, pivots to open and closed positions. A lift mechanism, such as a hydraulic cylinder, linear actuator, or mechanical screw operates to open and close the shell. One end of the lift mechanism can be attached to a lower position on the hinge support. The other end is attached to an inside top surface of the shell. One or more lock blocks are positioned on a lower edge of the sidewalls of the shell. As the shell is lowered, the lock blocks engage and enter stake bed opening on the truck bed sidewalls. From the closed position, the lift mechanism first lifts a forward edge from the forward wall, the pushed the shell rearward to disengage or unlock the lock blocks, and then the shell is pivoted upwards. From the open position, the shell is lowered with the lock blocks entering the stake bed opening on the edge of the bed, the shell is pulled rearward to lock the lock blocks, and then the front edge of the shell is pulled downward to seal against the forward wall.

10 Claims, 4 Drawing Sheets

FLIP TOP LOCKING TRUCK TOPPER

BACKGROUND OF THE INVENTION

The present invention relates to a flip top locking truck topper and more particularly to a topper for a pick up truck in which the topper pivots open and closes, and locks down in the closed position.

There are known several different pickup toppers, or shells, in which the shell, or a portion of the shell, rotates between a closed position and an open position. Most have some sort of lifting mechanism and pivot about some sort of hinge. Each has certain advantages and disadvantages.

Some of the problems associated with the prior toppers include unstable lifting mechanisms. The lifting mechanisms on some do not hold the shell in a stable open position. They wobble and wiggle, and cannot be in the open position when the truck is in motion.

Another problem is when the shell closes. The shell does not properly seal against the truck. This causes water and air leakage into the cargo area under the shell. The whole purpose of the shell is to keep the cargo protected from the elements. If the shell is not properly sealed, and water enters the cargo area, the purpose is defeated.

When the shell is in a closed position, often the lifting mechanism is the only thing maintaining the shell in a proper position on the truck. Ideally the sides of the shell match and mate with the sides of the pickup truck side walls, and the back matches and mates with the top of the tailgate. Many of the prior art would not and could not close and seal the shell in a proper position. The rear end of the topper shell would be unstable and would twist or skew to one side or the other preventing proper positioning. The lifting mechanism generally positioned in the front of the shell was not effective in controlling the rear of the shell. In addition, as the truck is in motion, the rear of the shell could wobble and shake due to air currents when in motion. Generally, the rear end of the shell was not stable and would not seal properly.

Accordingly, it is an object of the present invention to provide a flip top locking truck topper that is adapted to open and close in a particular manner that ensures a proper position of the sides and back of the shell with the side walls and tailgate of the pickup. This ensures a proper seal between the shell and pickup.

Another object of the present invention is to provide an improved flip top locking truck topper that is constructed to provide a complete seal between the topper and the truck and maintaining a tight seal at the rear end of the topper. It has been demonstrated that the lock block of this invention securely locks and seals sealing surface of the shell against the top edge of the pickup truck bed walls. This assures a water and air tight seal.

A further object of the present invention is to provide a flip top locking truck topper that is can be locked in a closed and sealed position, and thereby ensuring a complete seal and a rear end of the topper being locked in a closed position to ensure stability to prevent wobble and twisting.

Still another object of the present invention is to provide a flip top locking truck topper in which the lifting mechanism lifts and breaks the forward seal, pushes the shell rearward to "unlock" the rear end, and then pivot the shell from a closed position to an open position. In closing, the lift mechanism lowers the shell to engage a locking device, pulls the shell forward to lock the locking device and pulls the front downward to seal the front and completely seal the side edges. It has been demonstrated that the combined action of the lifting mechanism and arrangement of the various components provides a complete seal between the truck and shell, and locks the rear of the shell at the rear of a truck to provide a very stable rear end of the shell.

To accomplish the foregoing and other objects of this invention there is provided a flip top locking truck topper and more particularly to a topper for a pickup truck that the entire topper pivots on a hinge to open and close.

SUMMARY OF THE INVENTION

The flip top locking truck topper of this invention includes a topper having a forward wall and a pivoting shell. The shell, less the forward wall, pivots via a hinge and lifting mechanism to open and close the shell. A lift mechanism, such as a hydraulic cylinder or mechanical screw, operates to pivot the shell. One end of the lift mechanism is attached to a lower position on a hinge support. The other end is attached within an inside top surface of the shell. The lift mechanism opens the shell by first lifting the forward end to break a seal between the forward wall and a front edge of the shell, pushes the shell rearward to release or unlock the rear end, and then pivots the shell upward pivoting about the hinge.

A lock block, one or more, at a rear position on a lower edge of the lower sealing surface of the shell interacts and engages a stake bed opening(s), or equivalent, at the rear sidewalls on the pick up. The lock block(s) secures and locks the rear end of the topper to the rear of the pick up truck.

In closing, the lift mechanism pivots the shell downward and engages the lock block in the stake bed opening, pulls the shell forward to lock the lock block(s) in the stake bed opening(s), and pulls the front of the shell downward to seal the front of the shell to the forward wall and to complete the seal along the edges.

The above mentioned and other objects, and features of the present invention will be better understood and appreciated from the following detailed description of the main embodiment thereof, selected for purposes of illustration and shown in the accompanying drawings.

DETAILED DESCRIPTION

Figure 1:
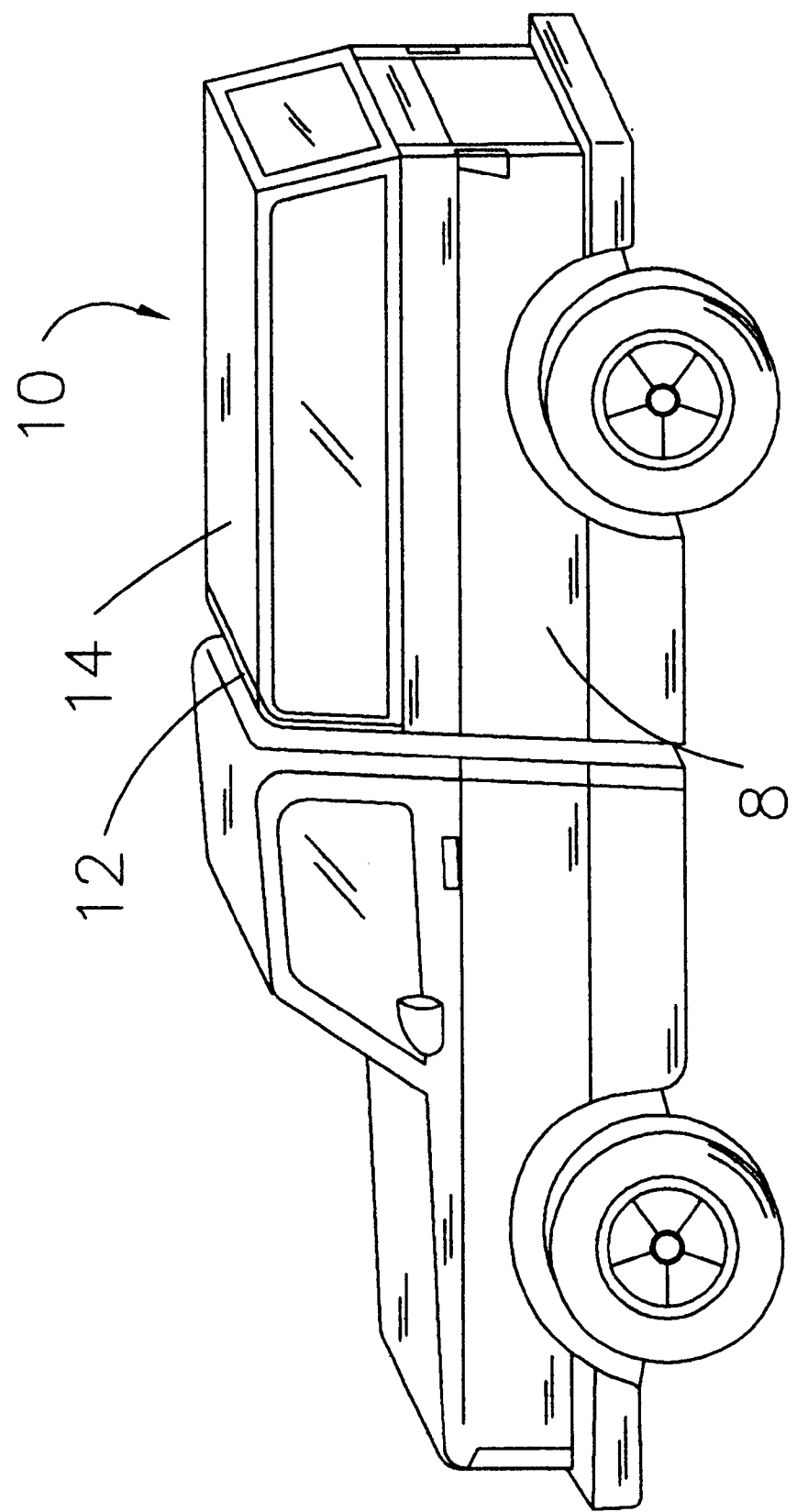
FIG. 1 is a side view showing the flip top locking truck topper on a truck with the shell in a closed position.
Figure 2:
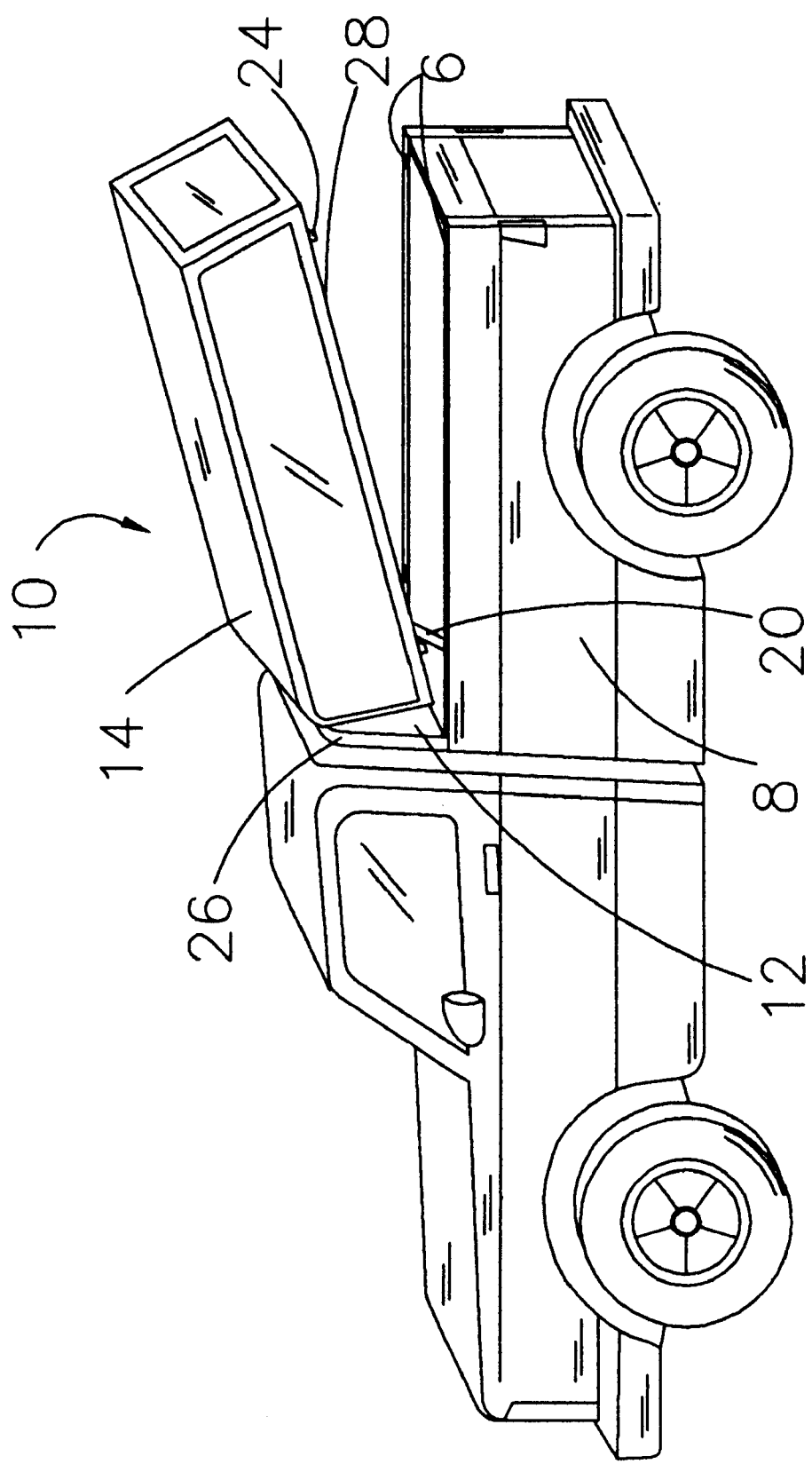
FIG. 2 is a side view showing the flip top locking truck topper on a truck with the shell in an open position and showing a lock block on a lower edge of the shell.
Figure 3:
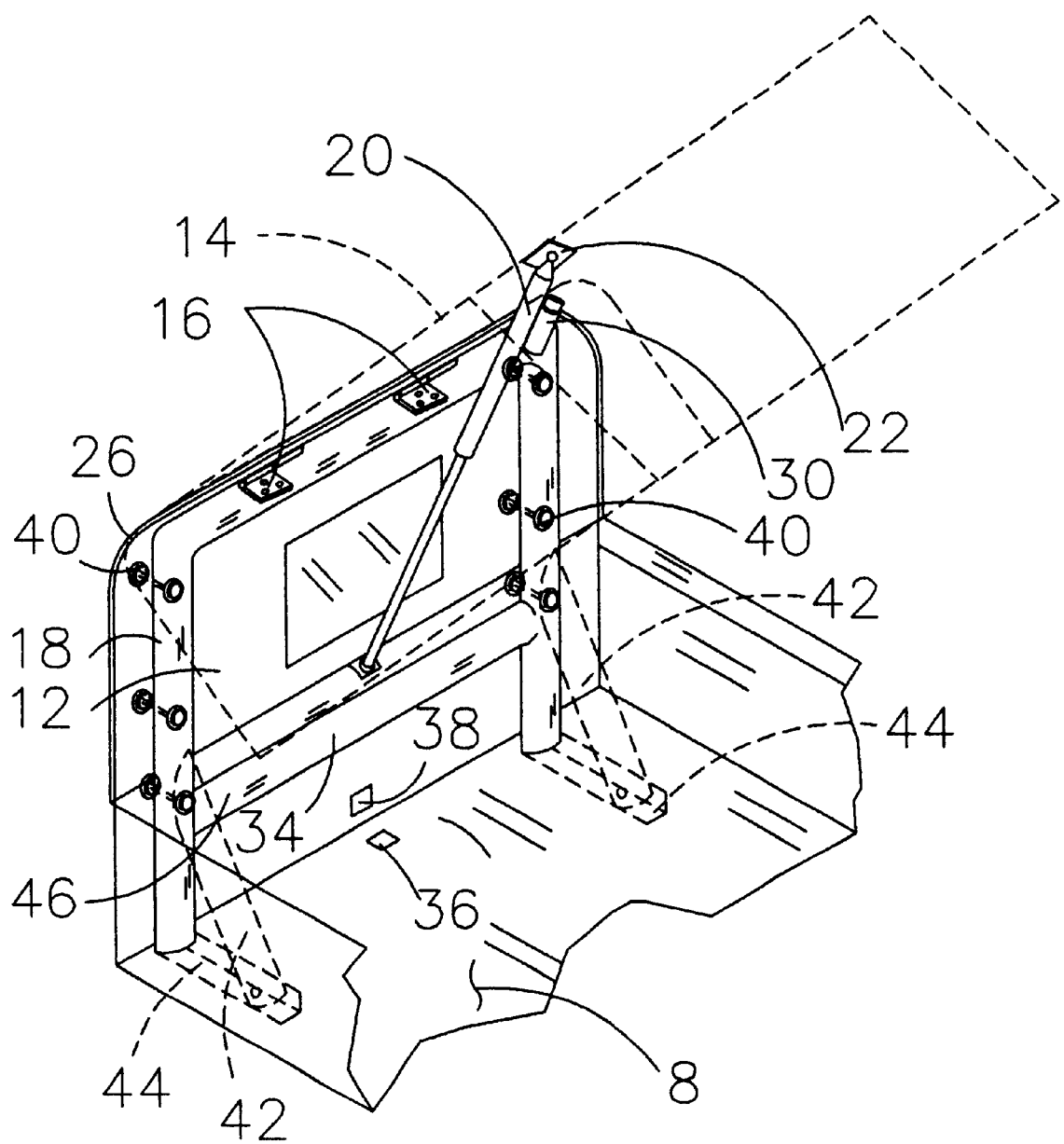
FIG. 3 is a partial sectional view showing the forward wall, hinge support, adjusters, hinges, the shell in phantom, the lifting mechanism, and support plate in a bed of a pickup truck.
Figure 4:
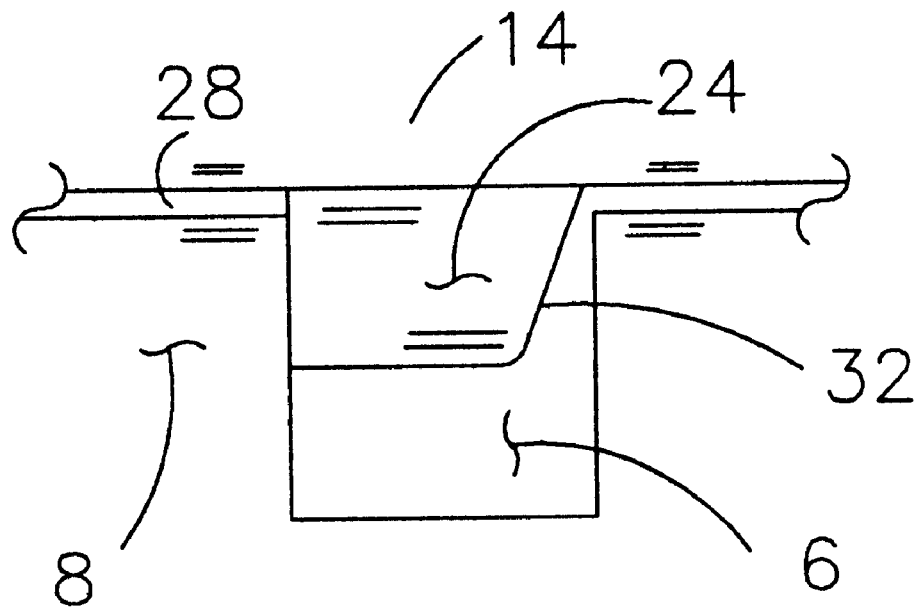
FIG. 4 is a side view showing the lock block within and locked in a stake bed opening on the side wall of a pickup truck bed, the shell being in a closed position.
Figure 5:
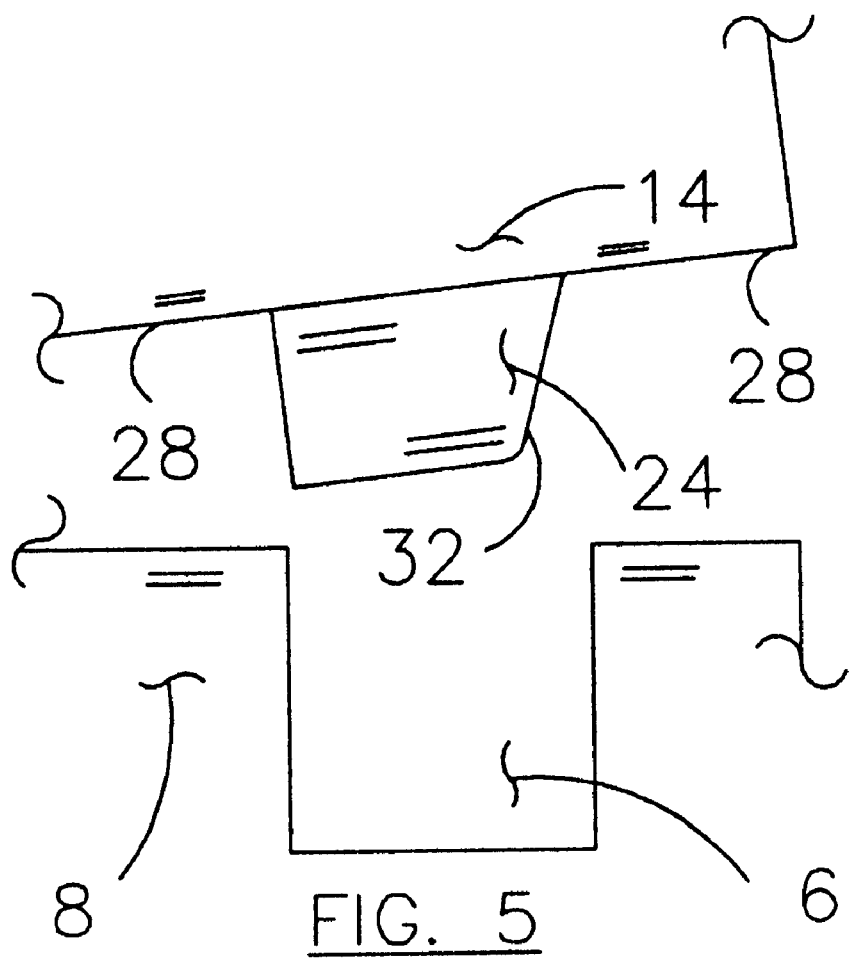
FIG. 5 is a side view showing the lock block above a stake bed opening with the shell in a partially open position.

Referring now to the figures in general, there is shown one preferred embodiment for the flip top locking truck topper of this invention.

Describing the invention in general, there is a topper 10 having a fixed forward wall 12 and a pivoting shell 14. At the forward end of the pivoting shell 14 there is one or more hinges 16 which are attached to a hinge support 18. The hinge support 18 is rigidly attached to a forward end of the pickup truck box 8. The entire shell 14 pivots on hinge(s) 16 to open the box of the pickup. A lift mechanism 20, such as a hydraulic cylinder, linear actuator, mechanical screw, or equivalent, operates to open and close the shell 14. One end of the lift mechanism 20 is attached to a lower position on the hinge support 18 or within the pickup truck bed 8. The other end is typically attached to a support plate 22 on an inside top surface of the pivoting shell 14.

The lift mechanism 20 opens the topper by pivoting the entire shell 14 on the hinge(s) 16, in a specific manner. When in the closed position, a lock block 24 (one or more) on the bottom edge of the pivoting shell 14 interact with stake bed opening(s) 6, or equivalent, on the edge of the pickup box 8 to keep the rear of the shell 14 locked and sealed in the closed position. To open the pivoting shell 14, the lift mechanism 10 lifts the forward portion of the shell 14 to break the seal 26 between the forward wall 12 and the forward edge of the shell 14, pushes the shell 14 rearward to unlock the lock block 24 from the stake bed opening 6, and then raises the rear of the shell 14 to an open position.

The preferred embodiment and the best mode contemplated of the flip top locking truck topper 10 of the present invention are herein described. However, it should be understood that the best mode for carrying out the invention hereinafter described is offered by way of illustration and not by the way of limitation. It is intended that the scope of the invention includes all modifications which incorporate its principal design features.

A topper 10, in the preferred embodiment has a forward wall 12 and a pivoting shell 14. The forward wall 12, as the name implies, is the forward or front section of the topper 10. However, it is independent of the shell 14, in that they are two separate sections. The forward wall 12 is in a fixed position generally positioned parallel to a rear window of a pickup truck and sealed against a top edge of the forward wall on the pickup truck bed 8.

The forward wall 12, in the preferred embodiment, is attached to the front of the hinge support 18. This provides a means of securing the forward wall 12 in place and securing a lower edge of the forward wall 12 against the top edge of the forward wall of the pickup bed 8. The forward wall 12 can be attached by screws, bolts or by any other suitable attachment means. This is only one means of attaching the forward wall 12 to the top edge of the forward wall of the pickup truck bed 8. In other embodiments (not shown), mounting brackets of one sort or another, with appropriate hardware, could be used as appropriate for the particular configuration.

In the preferred embodiment, the forward wall 12 is attached by adjusters 40. The adjusters 40 provide a means of adjusting the position of the forward wall 12. By way of the adjusters 40, the forward wall 12 can be moved in or out so as to position the outer edge of the forward wall 12 to properly mate with the forward edge of the shell 14. In a most simple and preferred embodiment, the adjusters 40 are bolts attached to the forward wall 12 and extend through holes in the hinge support 18. Nuts and washers on both sides of the hinge support 18 allow the forward wall 18 to be adjusted in or out, tilted, or skewed or twisted to one side or the other and locked in the correct position. Other means of adjustment and attachment could be used.

The forward wall 12 may have a window, as is common in the art, to generally correspond to the rear window in the cab of the truck. The window is not an inventive feature of this invention and is not further discussed.

The pivoting shell 14, or shell in short, will have left and right side walls, top portion, and a rear section. The rear section may or may not have a window, door or both. The side walls may have windows. This is similar to most other shells or toppers known in the art, with the exception of having a separate and independent forward wall.

Along the outer edge of the forward wall there is a seal 26. This seal 26 is used to seal a forward edge of the shell 14 against the outer edge of the forward wall 12. Typically the seal 26 is a C or U channel type of sealing material. It is simply pressed, and perhaps applied with an adhesive, onto the outer edge of the forward wall 12. Other sealing materials and methods could also be used without departing from the scope and spirit of this invention. The only purpose is to seal the outer edge of the forward wall 12 with the forward edge of shell 14. Any material or method performing this function will satisfy the intent of this purpose. The same or another sealing material is also typically used to seal the lower edge of the forward wall 14 to the top edge of the forward wall of the pickup truck bed 8.

A hinge support 18 is rigidly attached to a forward end on the inside of the pickup truck bed 8. It will typically be secured to the bed of the truck 8 by brackets of one sort or another. Additionally, a bolt 46 may be used extending through the upright legs of the hinge support 18 and through the forward wall of the truck bed. Bolt 46, if used or needed, provides a secure method of stabilizing the hinge support. In the preferred embodiment, the hinge support 18 is made from steel tubing having two upright legs and an upper cross member. It can be made as one continuous unit or it can be made from separate components appropriately joined. The hinge support 18 can also be similar to many roll bars known in the art. Additional support legs 42 may be used to support and solidify the hinge support 18. Typically, this would be legs 42 or brackets extending downward at an angle from the upright legs down to the bed or side wall of the pickup truck bed 8. The upper portion of support leg 42 may be attached to a lower adjuster 40 or to a bolt 46, if used. A bracket of some sort may be used to attach the leg 42 to the truck or a bracket 44 may extend between the lower end of hinge support 18, that can also be attached to the bed of the truck. Additional support brackets, legs, and/or cross members extending between the legs may also be used as desired or needed by the application.

The hinge support 18 preforms several functions. As the name implies, the hinges 16 are attached to the cross member. As such, the hinge support 18 is the primary support for the shell 14 as it raises and lowers. The forward wall 12 can also be attached and supported by the hinge support 18, as shown for the preferred embodiment.

The hinge support 18 as shown is formed from one continuous piece of steel tubing, as the preferred embodiment. However, any configuration equivalently performing the functions of the hinge support 18 would satisfy the intent of this component and be within the scope and spirit of the invention.

One or more hinges 16 are used to provide a means for the shell 14 to pivot between a closed position and an open position. In the preferred embodiment, as shown, two hinges 16 are used. However, it is conceivable that one continuous hinge could be used or three or several could be used. The shell 14 design, materials that the shell 14 is made, the shape of shell 14, weight, and size are some of the considerations in determining what type and how many hinges would be needed. The primary purpose of the hinge is to provide a means for the shell 14 to pivot between closed and open positions. Any hinge, any number of hinges, or some other equivalent configuration performing this function would be within the scope and spirit of this invention.

As indicated, the preferred embodiment as shown, has two hinges 16. Each hinge is a heavy duty hinge having steel bearings or bushings. Steal bearings or bushings are preferred because of the forces exerted on the hinge(s). The lifting mechanism 20 first lifts the forward portion of the shell 14 to separate and break the seal between the forward wall 12 and the forward edge of the shell 14, pushes the shell 14 rearward to unlock the lock block 24, and then pivots the shell 14. This action creates and applies tremendous forces on the hinge(s) 16. Therefore, it is preferred that heavy duty hinge(s) 16, and preferably having steel bearing, be used because of the forces.

Throughout this discussion the terms hinge and hinges are used, and are interchangeable. One or more hinges can be used. Therefore, the functions and features of hinge versus hinges mean the same.

One plate of the hinge 16 is attached to the cross member on the hinge support 18. It can be welded, bolted, screwed, or attached by any acceptable method. The other hinge plate is attached to an inside surface of the top portion of the shell 14. In some instances, depending on the shell, additional support may be added for strength. Again, it can be attached by welding (if metal), bolts, screws, adhesive, or by any acceptable method.

One or more lock block(s) 24 are attached to a lower sealing edge at a rear position on the side walls of the shell 14. Again block versus blocks mean the same. In some instances it is conceivable that only one will be used and four in another configuration. So what applies to one applies to all. One or more is intended. In the preferred embodiment as shown, two lock blocks 14 are used. This is because in most situations, there will be one at each rear corner. This arrangement provides the greatest stability, the greatest locking capability, and provides sealing along the edge on both sides.

The lock block 24 is typically a solid block in a shape that will interact, engage, fit within, and lock against a forward surface of a stake bed opening 6 on the pickup. The lock block 24 can be made from several different materials. Typically, preferably, it is made from a hard rubber or plastic. In the best mode contemplated and in the preferred embodiment, the lock block 24 is made from recycled plastic. Typically, the lock block 24 is generally rectangular in cross section and sized to fit within the stake bed opening 6. The rear facing surface 32 is generally curved. The rear facing surface 32 being curved allows for lock block 25 to act as a guide while the shell 14 is being lowered. It helps in that the lock block 24 will easily slip into the stake bed opening 6 without hanging on a protruding edge. Since the shell 14 is coming down at an angle, the curved surface 32 provides needed clearance. As the shell 14 is being lowered, the curved surface 32 of the lock block 24 slightly pushes the shell forward and better positions the shell 14 on the truck. As the shell 14 is being raised, the curved surface provides clearance for the lock block 24 to clear the rear edge of the stake bed opening 6.

The location of the lock block 24 on the lower sealing edge of on the side walls of shell 14 corresponds to a position of a stake bed opening 6 on side wall of the pickup truck bed 8. Typically, pickup trucks have stake bed openings 6 located along the top edge of the side walls. This allows a simple placement and attachment of the lock block 24 on the lower sealing surface on the side walls of the shell 14. The lock block 24 is typically attached by screws, bolts, adhesives or any other acceptable method or combination thereof, that provides the needed strength. Since the shell 14 is pulled forward to lock a forward surface of the lock block 24 against the forward inside surface of the stake bed opening 6, the means of attaching the lock block 24 must be strong enough to prevent the lock block 24 from being pulled off. Any means accomplishing this function is satisfactory.

In some instance, especially with smaller pickup, there are no stake bed openings. In these situations, a bracket of some sort resembling a stake bed opening can be attached to the inside edge of the side walls of the bed. In this situation the lock block 24 position may be offset to account for the difference in location. The lock block 24 in either situation locks a rear end of the shell 14 down against the side walls of the pickup bed 8 and secures the shell 14 in the closed position.

A lift mechanism 20 is used to raise and lower the shell 14. The lift mechanism 20 can be a hydraulic cylinder, linear actuator, air cylinder, mechanical screw, or some equivalent device. The primary function of the lift mechanism 20 is to raise and lower the shell 14. The lift mechanism first slightly lifts the forward end of the shell 14 to separate and break the seal 26, and then pushes the shell rearward before rasing the shell. These actions require considerable strength and force in order to overcome the opposing forces of the hinge 16 and hinge support 18. Therefore, the lift mechanism used must be capable of overcoming these forces and have durability. Any lifting mechanism 20 overcoming the forces created, has durability, and that can raise and lower the shell 14 is satisfactory. In the preferred embodiment, a heavy duty linear actuator using steel ball bearings is used. An electric motor 30 on the side of the linear actuator/lift mechanism 20 drives the actuator and can create several hundred feet pounds of pressure. In addition, Linear actuators are durable, generally readily available, and can be stopped at any location to provide the capability to raise the shell to any location within its range.

In the preferred embodiment, one end of the lift mechanism 20 is attached to a lower position on the hinge support 18. In order to do this, a lower coss member 34 can be added between the upright legs on the hinge support 18. The end of the lift mechanism 20 would be attached at a center location of cross member 34 in accordance with manufacture recommendations. The means of attachment would, of course, depend on the type, style and manufacture of the lift mechanism 20 used.

There are alternative locations for attachment of the lower end of the lift mechanism 20 depending on the exact configuration of the topper 10, pickup truck being used, configuration of the hinge support 18, and the exact type of lift mechanism being used. Alternative locations include, but are not limited to, a forward center position 36 on the bed of the pickup truck or on a lower center position on the inside surface of the forward wall of the pickup bed 38. A support plate of some sort may be used as required.

The other end, or upper end, of the lift mechanism 20 is attached at a center location to an inside surface of the top portion of the shell 14. The point of attachment is considered critical. The position of attachment of the upper end of the lift mechanism 18 to the shell 14 and the angle of the lift mechanism 18 determines the lifting characteristics. Placed to far forward places too much upward force on the forward end of the shell 14 and does not create enough rear facing forces to release the lock block 24 from the stake bed opening 6. Placed too far rearward creates too much rearward force and does not raise the forward end of the shell 14 to break the seal between the shell 14 and the forward wall 12.

The position of attaching the upper end of the lift mechanism 20 to the shell 14 and the angle of the lift mechanism 20 must create an upward force to first separate the forward edge of the shell 14 from the forward wall 12. Once this is done, the forces of the hinges 16 and hinge support 18 must over come the upward forces. The forces are then redirected to create a rearward force that pushes the shell 14 rearward to release or unlock the lock block 24 from the stake bed opening 6. It only requires a rearward motion enough to separate the forward surface of the lock block 24 from the forward inside surface of the stake bed opening 6. Only a fraction of an inch of rear motion is required. The hinges 16 then allow the lifting force created by the lift mechanism 20 to pivot the shell 14 to raise the rear of the shell 14.

In closing the opposite occurs. The shell 14 is first lowered with the lock block 24 engaging and entering the stake bed opening 6. Once the shell is in a lower position, the lift mechanism pulls the shell forward to lock the forward surface of the lock block 24 against inside forward surface of the stack bed opening 6. Once this is accomplished the forward end of the shell 14 is pulled downward to seal it against seal 28 on the outer edge of the forward wall 12.

A lower sealing surface on the lower edge of each of the side walls of the shell 14 generally have one or two seals 28. As the shell 14 is lowered, the seal 28 contacts the upper edge of the side walls of the pickup bed 8. Once locked down and the front of the shell 14 is pulled down, the seal(s) are compressed between and along the length of the lower sealing surface of the side walls of shell 14 and the top edge of the side walls of the truck bed 8. This assures a water and air tight seal between the shell 14 and the truck bed 8.

Having described the invention in detail, those skilled in the art will appreciate that modifications may be made of the invention without departing from the spirit of the inventive concept herein described.

Therefore, it is not intended that the scope of the invention be limited to the specific and preferred embodiments illustrated and described. Rather, it is intended that the scope of the invention be determined by the appended claims and their equivalents.

What is claimed is:

1. A flip top locking truck topper comprising:
   a topper having a forward wall in a fixed position somewhat positioned parallel to a rear window of a pickup truck, and a pivoting shell having side walls, a top portion, and a rear portion; a lower edge of the forward wall sealing against a forward portion of the pickup truck bed;
   a seal between an outer edge of the forward wall and a forward edge of the shell;
   a hinge support rigidly attached to a forward end inside of the pickup bed, the forward wall being forward of the hinge support;
   one or more hinges, one plate of the hinge being attached to the hinge support, and another hinge plate being attached to an inside surface of the top portion of the shell;
   one or more lock block(s), the lock block attached to a lower sealing edge at a rear position on the lower edge of the side walls of the shell corresponding to position of a stake bed opening or openings on side wall of the pickup truck bed, the lock block(s) engaging and interacting with the stake bed opening(s) on side walls of the pickup bed when the shell is in the closed position, the lock block locks and secures a rear end of the shell to the side walls of the pickup bed and secures the shell in the closed position; and
   a lift mechanism, one end of the lift mechanism attached to a lower position on the hinge support, a forward position within the truck bed or forward wall of the pick up truck bed, and another end of the lift mechanism attached to an inside surface of the top portion of the shell; the lift mechanism lifting and pivoting the shell between a closed position and an open position; from the closed position, the lifting mechanism first lifts a forward end of the shell to break a seal between the forward wall and the forward edge of the shell, then pushes the shell rearward to disengage the lock block(s) from the stake bed opening(s), and then pivoting a rear end of the shell upward about the hinge(s); and from the open position, the lifting mechanism pivots the shell downward about the hinge(s) to a closed position inserting the lock block(s) into the stake bed opening (s), pulls the shell forward to engage and lock the lock block within the stake bed opening(s), and then pulls the forward edge of the shell downward to seal the forward edge to the seal on the forward wall.

2. The flip top locking truck topper as set forth in claim 1 further comprising lower sealing edges along lower edges of the sidewall on the shell, and seals on the sealing edge; the seals being compressed between the lower seal edge and a top edge of sidewalls of the truck bed when the shell is lowered and locked in a closed position.

3. The flip top locking truck topper as set forth in claim 1 in which said hinge(s) is a heavy duty hinge having steel bushing or steel bearings.

4. The flip top locking truck topper as set forth in claim 1 in which said lift mechanism is a linear actuator, hydraulic cylinder, air cylinder, or a mechanical screw.

5. The flip top locking truck topper as set forth in claim 1 further comprising adjusters, said adjusters adjustable attaching the forward wall to the hinge support and providing a means to adjust the position of the forward wall.

6. The flip top locking truck topper as set forth in claim 1 in which a rear facing surface of the lock block(s) has a curved surface.

7. The flip top locking topper as set forth in claim 1 further comprising one or more support legs, the support legs extending between upright legs of said hinge support to the bed of the truck.

8. A flip top locking truck topper comprising:
   a topper having a forward wall in a fixed position somewhat positioned parallel to a rear window of a pickup truck, and a pivoting shell having side walls, a top portion, and a rear portion; a lower edge of the forward wall sealing against a forward portion of the pickup truck bed;
   lower sealing edges along lower edges of the sidewall on the shell, and seals on the sealing edge; the seals being compressed between the lower seal edge and a top edge of sidewalls of the truck bed when the shell is lowered and locked in a closed position;
   a seal between an outer edge of the forward wall and a forward edge of the shell;
   a hinge support rigidly attached to a forward end inside of the pickup bed, the forward wall being forward of the hinge support;

adjusters, the adjusters adjustable attaching the forward wall to the hinge support and providing a means to adjust the position of the forward wall;

one or more hinges, said hinges being heavy duty and having steel bearings or bushings, one plate of the hinge being attached to the hinge support, and another hinge plate being attached to an inside surface of the top portion of the shell;

one or more lock block(s), a rear facing surface of the lock block being curved, the lock block being attached to the lower sealing edge at a rear position on the lower edge of the side walls of the shell corresponding to position of a stake bed opening or openings on side wall of the pickup truck bed, the lock block(s) engaging and interacting with the stake bed opening(s) on side walls of the pickup bed when the shell is in the closed position, the lock block locks and secures a rear end of the shell to the side walls of the pickup bed and secures the shell in the closed position; and a lift mechanism, one end of the lift mechanism attached to a lower position on the hinge support, a forward position within the truck bed or forward wall of the pick up truck bed, and another end of the lift mechanism attached to an inside surface of the top portion of the shell; the lift mechanism lifting and pivoting the shell between a closed position and an open position; from the closed position, the lifting mechanism first lifts a forward end of the shell to break a seal between the forward wall and the forward edge of the shell, then pushes the shell rearward to disengage the lock block(s) from the stake bed opening(s), and then pivoting a rear end of the shell upward about the hinge(s); and from the open position, the lifting mechanism pivots the shell downward about the hinge(s) to a closed position inserting the lock block(s) into the stake bed opening (s), pulls the shell forward to engage and lock the lock block within the stake bed opening(s), and then pulls the forward edge of the shell downward to seal the forward edge to the seal on the forward wall.

9. A flip top locking truck topper comprising:

a topper having a forward wall attached to a forward wall of a pickup truck bed and a pivoting shell for covering the bed;

a hinge support rigidly attached at a forward end inside of the pickup bed behind the forward wall one or more hinges, the hinge(s) being attached to the hinge support and to the forward end of the shell;

one or more lock block(s), the lock block attached to a lower edge of side walls of the shell corresponding to position of a stake bed opening or openings on side wall of the pickup truck bed; and a lift mechanism attached between a lower position on the hinge support, a forward position within the truck bed or forward wall of the pick up truck bed and an inside surface of the top portion of the shell; the lift mechanism lifting and pivoting the shell between a closed position and an open position; from the closed position, the lifting mechanism first lifts a forward end of the shell to break a seal between the forward wall and the forward edge of the shell, then pushes the shell rearward to disengage the lock block(s) from stake bed opening(s) on the top edge of the side walls of the pickup truck, and then pivoting a rear end of the shell upward about the hinge(s); and from the open position, the lifting mechanism pivots the shell downward about the hinge(s) to a closed position inserting the lock block(s) into the stake bed opening(s), pulls the shell forward to engage and lock the lock block within the stake bed opening(s), and then pulls the forward edge of the shell downward to seal the forward edge to the seal on the forward wall.

10. A method for a flip top locking truck topper in which the rear of a pickup truck topper is locked down when in the closed position, the steps comprising:

providing a lift mechanism for lifting and pivoting a shell of a topper between a closed position and an open position;

lifting a forward end of the shell to break a seal between a fixed forward wall of the topper and the forward edge of the shell;

pushing the shell rearward to disengage lock block(s) from stake bed opening(s) on a top edge of side walls of the pickup truck;

pivoting a rear end of the shell upward about the hinge(s) to an open position;

pivoting the shell downward about the hinge(s) to a closed position and inserting the lock block(s) into the stake bed opening(s);

pulling the shell forward to engage and lock the lock block(s) within the stake bed opening(s); and pulling the forward edge of the shell downward to seal the forward edge to the outer edge of the forward wall.

* * * * *